United States Patent
Yan et al.

[11] Patent Number: 5,720,686
[45] Date of Patent: Feb. 24, 1998

[54] TRANSMISSION SYSTEM

[75] Inventors: Hong-Sen Yan, Tainan; Kuen-Bao Sheu, Hu-Wei, both of Taiwan

[73] Assignee: National Science Council, Taipei, Taiwan

[21] Appl. No.: 669,157

[22] Filed: Jun. 24, 1996

[51] Int. Cl.$^6$ .................................................. F16H 37/00
[52] U.S. Cl. ............................................................. 475/211
[58] Field of Search .................................... 475/210, 211

[56] References Cited

U.S. PATENT DOCUMENTS

| | | | |
|---|---|---|---|
| 3,340,749 | 9/1967 | Magg et al. | 475/211 |
| 4,290,320 | 9/1981 | Abbott | 475/210 |
| 4,624,153 | 11/1986 | Itoh et al. | 475/211 |
| 4,644,820 | 2/1987 | Macey et al. | 475/211 |
| 4,836,049 | 6/1989 | Moan | 475/211 |
| 4,856,369 | 8/1989 | Stockton | 475/211 |
| 5,045,028 | 9/1991 | Rattunde et al. | 475/211 |
| 5,080,639 | 1/1992 | Sakakibara et al. | 475/211 |
| 5,230,669 | 7/1993 | Tervola | 475/211 |
| 5,364,316 | 11/1994 | Brambilla | 475/211 |

*Primary Examiner*—Dirk Wright
*Attorney, Agent, or Firm*—Klein & Szekeres, LLP

[57] ABSTRACT

The creation of the present invention is a transmission system, including an output shaft for outputting an output power; a stepped speed transmission device for steppedly speed-changing said output shaft having in a first instance a relatively lower rpm; a stepless speed transmission device for steplessly speed-changing said output shaft having in a second instance a relatively higher rpm; and a clutch device, connected to said stepped speed transmission device and said stepless speed transmission device for switching therebetween.

25 Claims, 3 Drawing Sheets

Table 1

| Transmission modes \ clutch | 306 | 308 | 307 | 309 |
|---|---|---|---|---|
| Constant speed ratio of first gear | X | | | X |
| Constant speed ratio of second gear | X | X | | |
| Stepless transmission | | | X | X |

X: representing the engaging status of the clutch

Table 2

| Transmission modes \ clutch | 407 | 408 | 406 | 409 |
|---|---|---|---|---|
| Constant speed ratio of first gear | X | | | X |
| Constant speed ratio of second gear | X | X | | |
| Stepless transmission | | X | X | |

X: representing the engaging status of the clutch

TRANSMISSION SYSTEM

FIELD OF THE INVENTION

The present invention is related to a transmission system for a vehicle, e.g. for a motorcycle, which combines both modes of a stepped transmission function together with a stepless transmission function into a transmission device. The transmission system includes a gear device having a constant speed ratio, a clutch, a brake and a belt disk device having a continuously varying speed ratio. In operation, the power of the motorcycle is at first transmitted in the constant speed ratio mode by utilizing the gear device; however as the clutch is engaged, the power is transmitted in the continuously varying speed ratio mode by employing the belt disk device. Consequently, this transmission system is concurrently provided with both modes of stepped transmission and stepless transmission for a vehicle, and thus a mechanical transmission efficiency is improved.

BACKGROUND OF THE INVENTION

The transmission devices of the prior art used for the motorcycles can be divided into two categories, i.e.:

(1) the stepped transmission device works by alternating the gear ratio of the two engaging gears for power transmitting.

(2) the stepless transmission device works by using V-shaped belt for power transmitting.

The advantages of the stepped transmission device are good reliability, sound durability, high mechanical efficiency and easy manufacturability owing to the skillful fabricating techniques nowadays. However, the number of the gears used for shifting the gear ratio is limited, thereby the power of the motorcycle is unable to be transmitted smoothly to the wheels, and thus the operating comfortableness of the motorcycles equipped with such stepped transmission device is inferior. In contrast to the stepped transmission device, the stepless transmission device transmits power by the v-shaped belt, which has the advantages of simple construction, relatively lower cost and easiness of operation. However, owing to the facts that the belt employed is apt to wear, and inclined to slack together with slip in the low rpm, hence the durability and the transmitting efficiency are poor, especially in the operation of start-up and during low rpm, where the efficiency is further getting worse.

SUMMARY OF THE PRESENT INVENTION

In the present invention, for concurrently overcoming the disadvantages and obtaining advantages of the conventional transmission device, a combination of the stepped transmission device together with the stepless transmission device is therefore invented.

The distinguishing feature of the present invention is that, the transmission system comprises a gears device having a constant speed ratio and a belt disk device having a continuously varying speed ratio.

As in start-up operation or running in low rpm situation, the power is transmitted via the high efficient gear device; the belt disk device with stepless transmission function is employed in a middle/high rpm running.

Therefore, an object of the present invention is to provide a transmission system including both modes of the stepped transmission function and the stepless transmission function.

The creation of the present invention is a transmission system, including an output shaft for outputting an output power; a stepped speed transmission device for steppedly speed-changing said output shaft having in a first instance a relatively lower rpm; a stepless speed transmission device for steplessly speed-changing said output shaft having in a second instance a relatively higher rpm; and a clutch device, connected to said stepped speed transmission device and said stepless speed transmission device for switching therebetween.

In accordance with an aspect of the present invention, the transmission system is employed by a vehicle.

In accordance with another aspect of the present invention, the stepped speed transmission device transmits in a constant speed ratio, the stepless speed transmission device transmits in a continuously varying speed ratio, and the transmission system mounts thereon an input shaft for inputting an input power.

In accordance with another aspect of the present invention, the stepped speed transmission device is a gears device, the stepless speed transmission device is a belt disk device and the clutch device includes a first clutch and a brake.

In accordance with another aspect of the present invention, the gear device has a constant speed ratio gear engaging with the belt disk device; and has a first and a second sprockets connected by a chain; the belt disk device includes a first and a second belt disks connected by a belt; and the clutch device further includes a second clutch.

In accordance with another aspect of the present invention, the first sprocket, the first clutch and the first belt disk are mounted on the input shaft; the first clutch is disposed between the first sprocket and the first belt disk; the second sprocket, the second clutch and the second belt disk are mounted on the output shaft; and the second clutch is disposed between the second sprocket and the second belt disk.

In accordance with another aspect of the present invention, as the output shaft is in the lower rpm, the first clutch is disengaged and the second clutch is engaged, such that the input power is transmitted from the input shaft to be converted into the output power from the output shaft through the first sprocket, the chain, the second sprocket and the second clutch.

In accordance with another aspect of the present invention, as the output shaft is in the higher rpm, the first clutch is engaged and the second clutch is disengaged such that the input power is transmitted from the input shaft to be convened into the output power from the output shaft through the first clutch, the belt and the second belt disk.

In accordance with another aspect of the present invention, the first belt disk, the first clutch and the first sprocket are mounted on the input shaft; the first clutch is disposed between the first belt disk and the first sprocket; the second belt disk, the second clutch and the second sprocket are mounted on the output shaft; and the second clutch is disposed between the second belt disk and the second sprocket.

In accordance with another aspect of the present invention, as the output shaft is in the lower rpm the first clutch is engaged and the second clutch is disengaged, such that the input power is transmitted from the input shaft to be converted into the output power from the output shaft through the first clutch, the first sprocket, the chain and the second sprocket.

In accordance with another aspect of the present invention, as the output shaft is in the higher rpm the first clutch is disengaged and the second clutch is engaged such that the input power is transmitted from the input shaft to be converted into the output power from the output shaft through the first belt disk, the belt, the second belt disk and the second clutch.

In accordance with another aspect of the present invention, the gear device has a first and a second constant speed ratio gears engaging with the belt disk device and further includes a planetary gear device and a first and a second sprockets connecting with each other via a chain; the belt disk device includes a first and a second belt disks engaging with each other via a belt; and the clutch device further includes a second and a third clutches and a brake.

In accordance with another aspect of the present invention, the planetary gear device includes a sun gear, a planet gear, a whirling arm and a ring gear.

In accordance with another aspect of the present invention, the first belt disk, the first clutch and the first sprocket are mounted on the input shaft; the first clutch is disposed between the first belt disk and the first sprocket; the second belt disk, the second clutch, the second sprocket, the brake, the third clutch and the planetary device are mounted on the output shaft; the second clutch is disposed between the second belt disk and the sun gear; the third clutch is disposed between the sun gear and the whirling arm, the sun gear is connected to the ring gear through the plant gear, and the whirling arm is connected to the output shaft.

In accordance with another aspect of the present invention, as the output shaft is in the lower rpm, the gear device has the first constant speed ratio gear thereof coupled with the belt disk device, the first clutch is engaged, the second clutch and third clutch are respectively disengaged, and the sun gear is locked by the brake, such that the input power is transmitted from the input shaft to be converted into the output power from the output shaft through the first clutch, the first sprocket, the chain, the second sprocket, the ring gear, the planet gear and the whirling arm.

In accordance with another aspect of the present invention, as the output shaft is in the lower rpm, the gear device has the second constant speed ratio gear coupled with the belt disk device, the first clutch and the third clutch are respectively engaged, the second clutch is disengaged, and the brake is idle, such that the input power is transmitted from the input shaft to be converted into the output power from the output shaft through the first clutch, the first sprocket, the chain, the second sprocket and the planetary gear device.

In accordance with another aspect of the present invention, as the output shaft is in the higher rpm, the first clutch is disengaged, the second clutch and the third clutch are respectively engaged, and the brake is idle, such that the input power is transmitted from the input shaft to be converted into the output power from the output shaft through the first belt disk, the belt, the second belt disk, the second clutch and the planetary gear device.

In accordance with another aspect of the present invention, the planetary gear device, the third clutch, the brake, the first sprocket and the first clutch are mounted on the input shaft; the first clutch is disposed between the sun gear and the first belt disk, the third clutch is disposed between the ring gear and the sun gear, the whirling arm is connected to the first sprocket, and the ring gear is used to couple with the input shaft; the second sprocket, the second clutch and the second belt are mounted on the output shaft; the second clutch is disposed between the second sprocket and the second belt disk.

In accordance with another aspect of the present invention, as the output shaft is in the lower rpm, the gear device has the first constant speed ratio gear thereof coupled with the belt disk device, the first clutch and the third clutch are individually disengaged, the second clutch is engaged, and the sun gear is locked by the brake, such that the input power is transmitted from the input shaft to be converted into the output power from the output shaft through the ring gear, the planet gear, the whirling arm, the first sprocket, the chain, the second sprocket and the second clutch.

In accordance with another aspect of the present invention, as the output shaft is in the lower rpm, the gear device has the second constant speed ratio gear thereof coupled with the belt disk device, the first clutch is disengaged, the second clutch and the third clutch are respectively engaged, and the brake is idle, such that the input power is transmitted from input shaft to be convened into the output power from the output shaft through the planetary gear device, the first sprocket, the chain, the second sprocket and the second clutch.

In accordance with another aspect of the present invention, as the output shaft is in the higher rpm, the first clutch and the third clutch are respectively engaged, the second clutch is disengaged, and the brake is idle, such that the input power is transmitted from input shaft to be converted into the output power from the output shaft through the planetary gear device, the first clutch, the first belt disk, the belt and the second belt disk.

In accordance with another aspect of the present invention, a separation between the lower rpm and the higher rpm for the output shaft depends on a performance of the transmission system required by a designer.

The present invention may be best understood through the following description with reference to the accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

The transmission system of the present invention includes concurrently both modes of the stepped transmission function and the stepless transmission function. Accordingly, it is an assemblage of the gear device having constant speed ratio function and the belt disk device having continuously varying speed ratio function.

Figure 1:
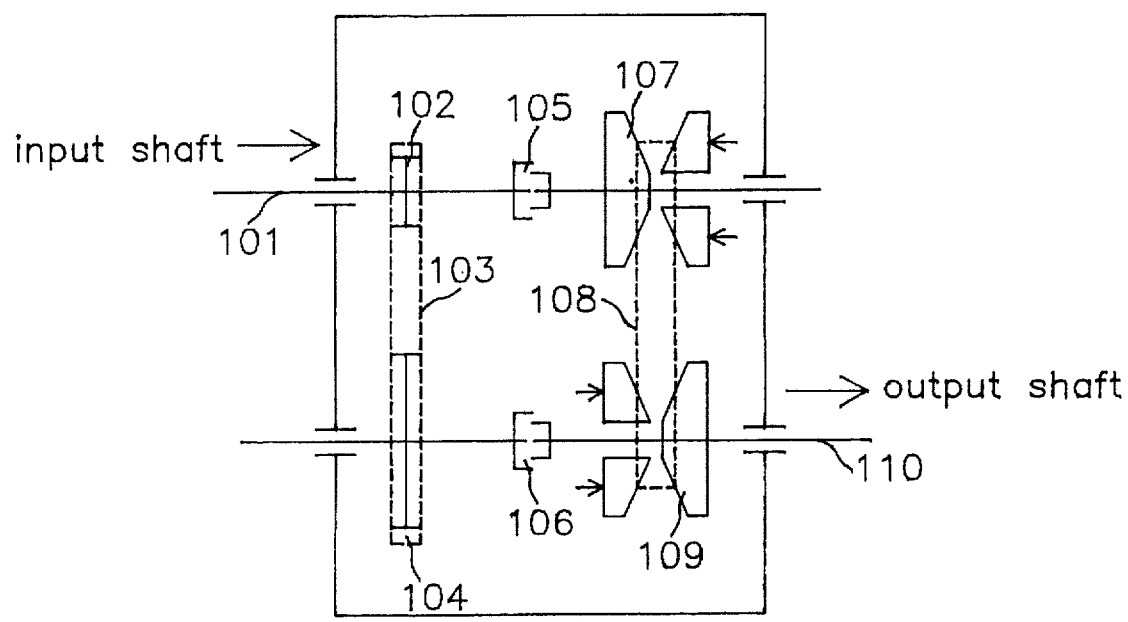
FIG. 1 is a schematic view showing a preferred embodiment of a combination of a stepped transmission device having a one-gear's constant speed ratio and a stepless transmission device according to the present invention.

Please refer to FIG. 1, which is a schematic view showing a preferred embodiment of a combination of a stepped transmission device having a one-gear's constant speed ratio and a stepless transmission device according to the present invention, and the relevant operating principles are described as follows:

The power output from the engine of the motorcycle is transmitted at first to the transmission system by the operation of the input shaft 101, and thus, thereafter the power flow is transmitted through the first gear 102, the chain 103, the second gear 104 and then to the second clutch 106. As the rpm of the engine arrives at a preset value, the second clutch is engaged. Accordingly the power is transmitted to wheels through the output shaft 110, since the first clutch 105 is disengaged at this occasion, and thereby the transmission is achieved by using the gear device having the gear constant speed ratio function.

As the rpm of the engine arrives at another specific preset value, the second clutch 106 is disengaged and the first clutch 105 is engaged, and thus the power flow is transmitted from the input shaft 101 through the first clutch 105, the first belt disk 107, the belt 108, the second belt disk 109 and then to the wheels through the output shaft 110. Accordingly, in this transmission the operation is performed by utilizing the continuously varying speed transmission function of the belt disk device. As to the operating principles for speed ratio change and engagement/disengagement of the clutch, both involved in the belt disk device having continuously varying speed ratio, they can be implemented by adopting different controlling approaches, such as mechanical approach, electrical approach, hydraulic approach, . . . etc.

Figure 2:
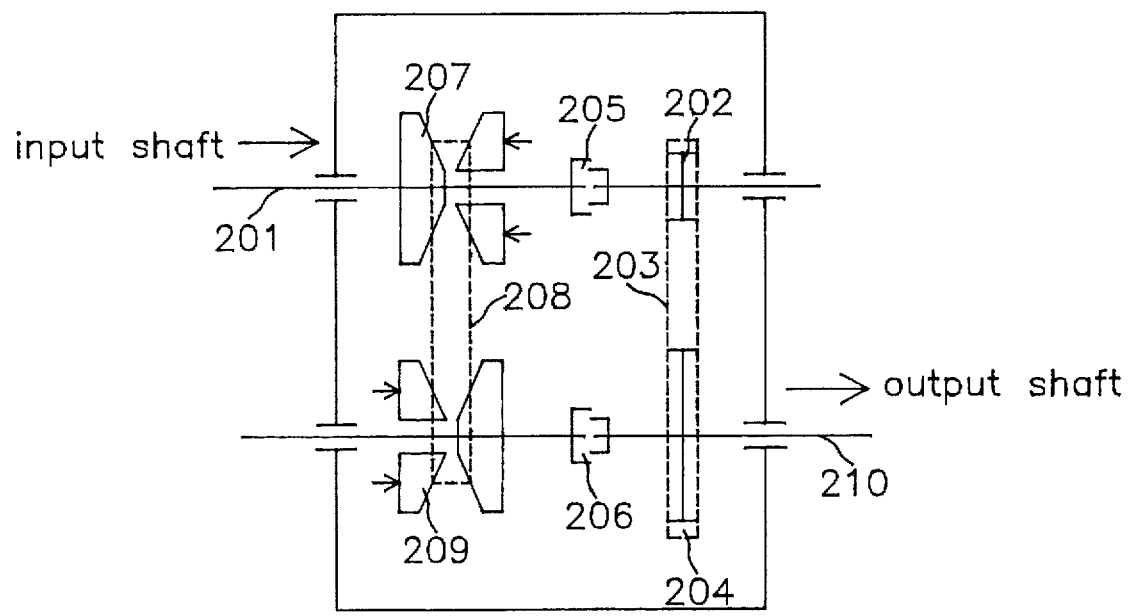
FIG. 2 is a schematic view showing another preferred embodiment of a combination of a stepped transmission device having a one-gear's constant speed ratio and a stepless transmission device according to the present invention.

Please refer to FIG. 2, which is a schematic view showing another preferred embodiment of a combination of a stepped transmission device having a one-gear's constant speed ratio and a stepless transmission device according to the present invention. As similar to the operating principles aforementioned, the different power flow is transmitted through the different route corresponding to the two different transmission modes:

(1) In the mode of the constant speed ratio transmission, wherein the first clutch 205 is engaged and the second clutch 206 is disengaged, the power flow is originated from the input shaft 201 and transmitted though the first clutch 205, the first gear 202, the chain 203, the second gear 204 and to the output shaft 210;

(2) In the mode of the continuously varying speed ratio transmission, wherein the second clutch 206 is engaged and the first clutch 205 is disengaged, the power flow is originated from the input shaft 201 and transmitted through the first belt disk 207, the belt 208, the second belt disk 209, the second clutch 206 and to the output shaft 210.

Figure 3:
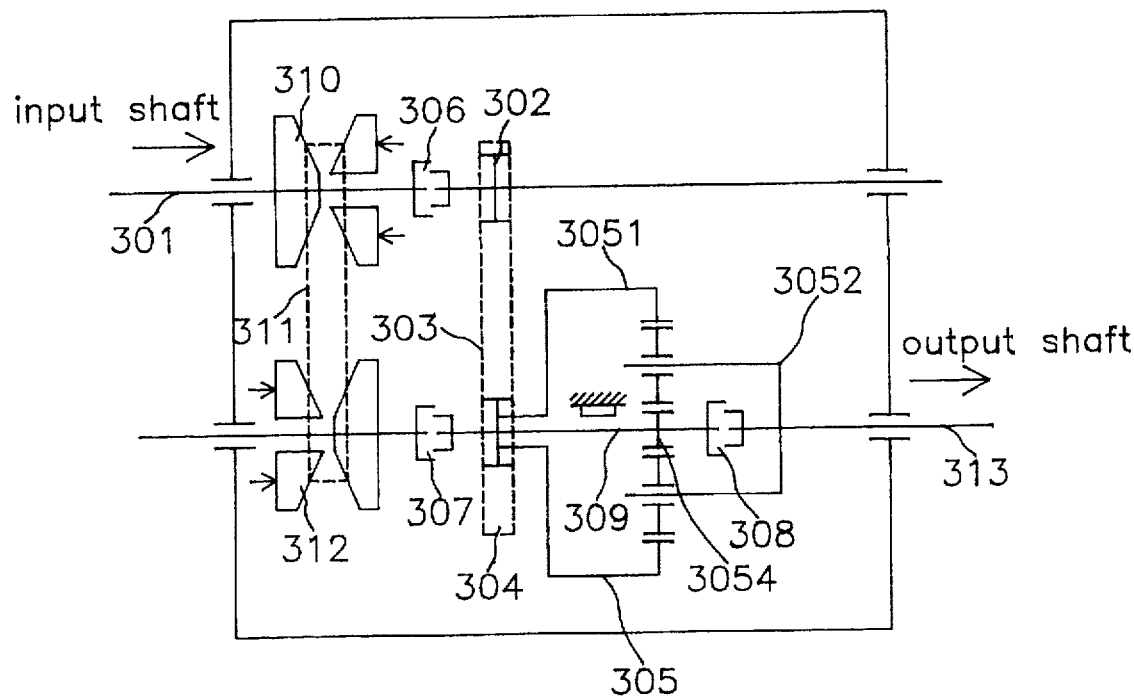
FIG. 3 is a schematic view showing a preferred embodiment of a combination of a stepped transmission device having a two-gear's constant speed ratio and a stepless transmission device according to the present invention.

Please refer to FIG. 3, which is a schematic view showing a preferred embodiment of a combination of a stepped transmission device having two-gear's constant speed ratio and a stepless transmission device according to the present invention, which includes the planetary gear device 305, the first clutch 306, the second clutch 307, the third clutch 308, the brake 309 and the belt disk device having the continuously varying speed ratio. The configuration of the planetary gear device includes four components, the sun gear 3054, the planet gear 3052, the whirling arm 3053 and the ring gear 3051. If the sun gear 3054 and the whirling arm 3053 are designed to be respectively coupled with the power input shaft 301 and the power output shaft 313, and the ring gear 3051 is secured at the frame, a various speed ratio is obtainable. In addition, if any two components of these three components of the planetary gear device above-mentioned are engaged with each other, then the planetary gear device will work as an entirety, which accordingly implies that the speed ratio for transmission is 1:1.

This preferred embodiment of the present invention is fulfilled by utilizing those three clutches and the brake aforementioned. Table 1 represents the operation status of the clutches and the brakes of the transmission system depicted in FIG. 3. Therefore, in addition to the fact that the planetary gear device is capable of performing the transmission of two-gear's constant speed ratio, the belt disk device is employed concurrently for obtaining the transmission of continuously varying speed.

The corresponding operation statuses of the clutches and the brake are shown in table 1, and the different transmitting routes for the power flow are constructed respectively according to those three different transmission modes described as follows:

(1) In the mode of one-gear's constant speed ratio transmission: As the first clutch 306 is engaged, and the brake 309 is braked; while the second clutch 307 and the third clutch 308 are respectively disengaged, the transmitting route for the power flow is originated from the input shaft 301 through the first clutch 306, the first sprocket 302, the chain 303, the second sprocket 304, the ring gear 3051 of the planetary gear device 305, the planet gear 3052 and the whirling arm 3053 to the output shaft 313;

(2) In the mode of two-gear's constant speed ratio transmission: As the first clutch 306 and the third clutch 308 are respectively engaged; the second clutch 307 and the brake 309 are respectively disengaged, the transmitting route for the power flow is originated from the input shaft 301 and transmitted through the first clutch 306, the first sprocket 302, the chain 303, the second sprocket 304 and the entirety of the planetary gear device 305 to the output shaft 313;

(3) In the mode of the continuously varying speed ratio transmission: As the second clutch 307 and third clutch 308 are respectively engaged and the first clutch 306 and the brake 309 are respectively disengaged, the transmitting route for the power flow is originated from the input shaft 301 and transmitted through the first belt disk 310, the belt 311, the second belt disk 312, the second clutch 307 and the entirely of the planetary gear device 305 to the output shaft 313.

Figure 4:
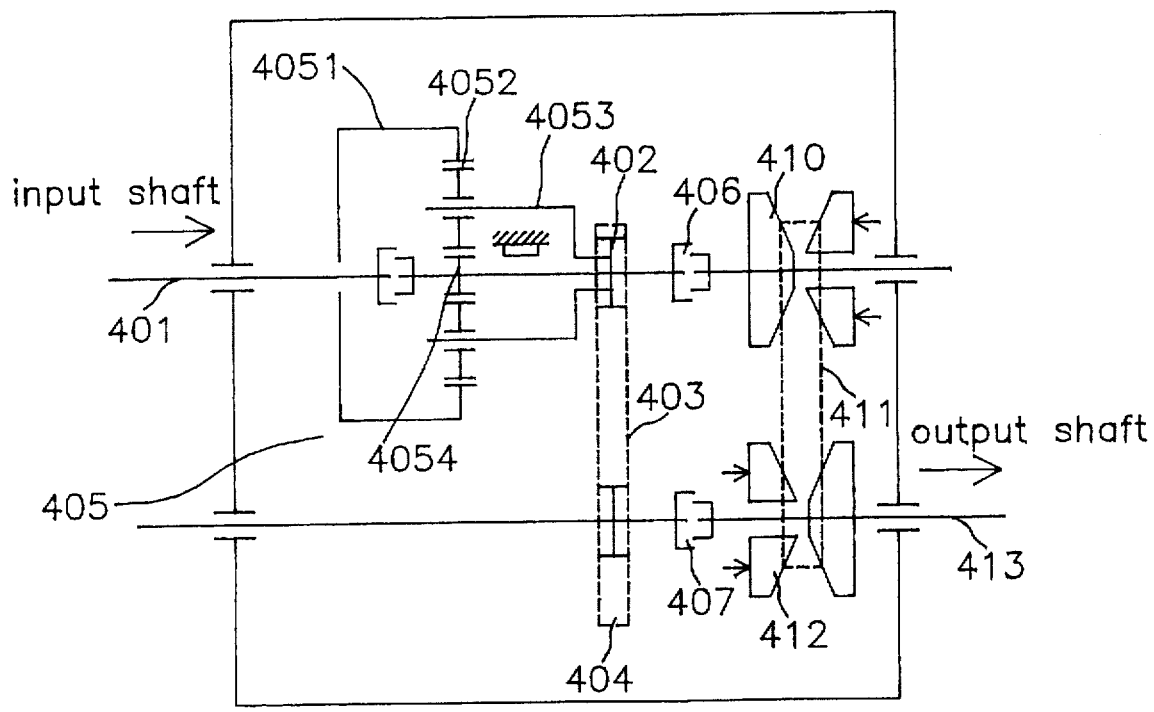
FIG. 4 is a schematic view showing another preferred embodiment of a combination of a stepped transmission device having two-gear's constant speed ratio and a stepless transmission device according to the present invention.

Please refer to FIG. 4, which is a schematic view showing another preferred embodiment of a combination of a stepped transmission device having two-gear's constant speed ratio and a stepless transmission device according to the present invention, and Table 2 represents the operation status of the clutches and the brakes of the transmission system depicted in FIG. 4.

The corresponding operation status of the clutches and the brake in this preferred embodiment are shown in table 2, and the different transmitting routes for the power flow are constructed respectively according to those three different transmission modes described as follows:

(1) In the mode of one-gear's constant speed ratio transmission: When the second clutch 407 is engaged, the brake 409 is braked and the first clutch 406 together with the third clutch 408 are respectively disengaged, the transmitting route for the power flow is originated from the input shaft 401 and transmitted through the ring gear 4051 of the planetary gear device 405, the planet gear 4052, the whirling arm 4053, the first sprocket 402, the chain 403, the second sprocket 404 and the second clutch 407 to the output shaft 413;

(2) In the mode of two-gear's constant speed ratio transmission: When the second clutch 407 together with the third clutch 408 are respectively engaged, and the brake 409 together with the first clutch 406 are respectively disengaged, the transmitting route for the power flow is originated from the input shaft 401 and transmitted through the entirety of the planetary gear device 405, the first sprocket 402, the chain 403, the second sprocket 404 and the second clutch 407 to the output shaft 413;

(3) In the mode of the continuously varying speed ratio transmission: When the first clutch 406 together with the clutch 408 are respectively engaged, and the second clutch 407 together with the brake 409 are respectively disengaged, the transmitting route for the power flow is originated from the input shaft 401 and transmitted through the entirety of the planetary gear device 405, the first clutch 406, the first belt disk 410, the belt 411 and the second belt disk 412 to the output shaft 413.

Therefore, in accordance with the above descriptions, the present invention provides a new idea for designing the transmission system for the vehicle, that is, the invention is to combine the both modes of the stepped transmission function together with the stepless transmission function into a new transmission system, and thereby, the transmitting efficiency of the entire transmission device is significantly promoted. Thus the fatigue damages of various components are reduced and the extreme speed of the vehicle is increased. Therefore, owing to the present invention, a new creation is provided especially for the urban motorcycle and the electro-dynamic motorcycles patrolling in urban downtown. Consequently, the present invention is practical and valuable for industrial usage.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as encompass all such modifications and similar structures.

What is claimed is:

1. A transmission system adapted to receive input power through an input shaft and transmit output power in response to said input power, comprising:

an output shaft for outputting said output power;

a stepped speed transmission device including a first stepped member mounted on said input shaft and a second stepped member mounted on said output shaft for steppedly speed-changing said output shaft having in a first instance a relatively lower rpm;

a stepless speed transmission device including a first stepless member mounted on said input shaft and a second stepless member mounted on said output shaft for steplessly speed-changing said output shaft having in a second instance a relatively higher rpm; and a clutch device including a first clutch arranged between said first stepped member and said first stepless member and a second clutch arranged between said second stepped member and said second stepless member, for switching the operation of said stepped speed transmission device and that of said stepless speed transmission device.

2. A transmission system as claimed in claim 1, employed by a vehicle.

3. A transmission system as claimed in claim 1, wherein said stepped speed transmission device transmits in a constant speed ratio, and said stepless speed transmission device transmits in a continuously varying speed ratio.

4. A transmission system as claimed in claim 3 wherein said stepped speed transmission device is a gear device, and said stepless speed transmission device is a belt disk device.

5. A transmission system as claimed in claim 4, wherein said gear device has a constant speed ratio gear engaging with said belt disk device; said first and said second stepped members are respectively a first and a second sprockets connected by a chain; said first and said second stepless members are respectively a first and a second belt disks connected by a belt.

6. A transmission system as claimed in claim 5, wherein said first sprocket, said first clutch and said first belt disk are mounted on said input shaft sequentially from upstream to downstream; and said second sprocket, said second clutch and said second belt disk are mounted on said output shaft sequentially from upstream to downstream.

7. A transmission system as claimed in claim 6, wherein as said output shaft is in said lower rpm, said first clutch is disengaged and said second clutch is engaged, such that said input power is transmitted from said input shaft to be converted into said output power from said output shaft through said first spocket, said chain, said second sprocket and said second clutch.

8. A transmission system as claimed in claim 6, wherein as said output shaft is in said higher rpm, said first clutch is engaged and said second clutch is disengaged such that said input power is transmitted from said input shaft to be converted into said output power from said output shaft through said first clutch, said belt and said second belt disk.

9. A transmission system as claimed in claim 5, wherein said first belt disk, said first clutch and said first sprocket are mounted on said input shaft sequentially from upstream to downstream; and said second belt disk, said second clutch and said second sprocket are mounted on said output shaft sequentially from upstream to downstream.

10. A transmission system as claimed in claim 9, wherein as said output shaft is in said lower rpm said first clutch is engaged and said second clutch is disengaged, such that said input power is transmitted from said input shaft to be converted into said output power from said output shaft through said first clutch, said first sprocket, said chain and said second sprocket.

11. A transmission system as claimed in claim 9, wherein as said output shaft is in said higher rpm said first clutch is disengaged and said second clutch is engaged such that said input power is transmitted from said input shaft to be converted into said output power from said output shaft through said first belt disk, said belt, said second belt disk and said second clutch.

12. A transmission system as claimed in claim 4, wherein said gear device has first and second constant speed ratio gears engaging with said belt disk device and further includes a planetary gear device; said first and said second stepped members are respectively first and second sprockets connecting with each other via a chain; said first and said second stepless members are respectively first and second belt disks engaging with each other via a belt; and said clutch device further includes a third clutch and a brake.

13. A transmission system as claimed in claim 12, wherein said planetary gear device includes a sun gear, a planet gear, a whirling arm and a ring gear, and said sun gear is connected to said ring gear through said planet gear.

14. A transmission system as claimed in claim 13, wherein said first belt disk, said first clutch and said first sprocket are mounted on said input shaft sequentially from upstream to downstream; and said second belt disk, said second clutch, said second sprocket, said brake, said sun gear, said third clutch and said whirling arm mounted on said output shaft sequentially from upstream to downstream.

15. A transmission system as claimed in claim 14, wherein as said output shaft is in said lower rpm, said gear device has said first constant speed ratio gear thereof coupled with said belt disk device, said first clutch is engaged, said second clutch and third clutch are respectively disengaged, and said sun gear is locked by said brake, such that said input power is transmitted from said input shaft to be converted into said output power from said output shaft through said first clutch, said first sprocket, said chain, said second sprocket, said ring gear, said planet gear and said whirling arm.

16. A transmission system as claimed in claim 14, wherein as said output shaft is in said lower rpm, said gear device has said second constant speed ratio gear coupled with said belt disk device, said first clutch and said third clutch are respectively engaged, said second clutch is disengaged, and said brake is idle, such that said input power is transmitted from said input shaft to be converted into said output power from said output shaft through said first clutch, said first sprocket, said chain, said second sprocket and said planetary gear device.

17. A transmission system as claimed in claim 14, wherein as said output shaft is in said higher rpm, said first clutch is disengaged, said second clutch and said third clutch are respectively engaged, and said brake is idle, such that said input power is transmitted from said input shaft to be converted into said output power from said output shaft through said first belt disk, said belt, said second belt disk, said second clutch and said planetary gear device.

18. A transmission system as claimed in claim 13, wherein said ring gear, said third clutch, said sun gear, said brake, said first sprocket, said first clutch and said first belt disk are mounted on said input shaft sequentially from upstream to downstream; and said second sprocket, said second clutch and said second belt disk are mounted on said output shaft sequentially from upstream to downstream.

19. A transmission system as claimed in claim 18, wherein as said output shaft is in said lower rpm, said gear device has said first constant speed ratio gear thereof coupled with said belt disk device, said first clutch and said third clutch are individually disengaged, said second clutch is engaged, and said sun gear is locked by said brake, such that said input power is transmitted from said input shaft to be converted into said output power from said output shaft through said ring gear, said planet gear, said whirling arm, said first sprocket, said chain, said second sprocket and said second clutch.

20. A transmission system as claimed in claim 18, wherein as said output shaft is in said lower rpm, said gear device has said second constant speed ratio gear thereof coupled with said belt disk device, said first clutch is disengaged, said second clutch and said third clutch are respectively engaged, and said brake is idle, such that said input power is transmitted from input shaft to be converted into said output power from said output shaft through said planetary gear device, said first sprocket, said chain, said second sprocket and said second clutch.

21. A transmission system as claimed in claim 18, wherein as said output shaft is in said higher rpm, said first clutch and said third clutch are respectively engaged, said second clutch is disengaged, and said brake is idle, such that said input power is transmitted from input shaft to be converted into said output power from said output shaft through said planetary gear device, said first clutch, said first belt disk, said belt and said second belt disk.

22. A transmission system adapted to receive input power through an input shaft and transmit output power in response to said input power, comprising:

an output shaft for outputting said output power;

a gear device including a first sprocket mounted on said input shaft and a second sprocket mounted on said output shaft for steppedly speed-changing said output shaft having in a first instance a relatively lower rpm;

a belt disk device including a first belt disk mounted on said input shaft and a second belt disk mounted on said output shaft for steplessly speed-changing said output shaft having in a second instance a relatively higher rpm;

a planetary device including a sun gear, a planet gear, a whirling arm and a ring gear, said sun gear connected to said ring gear through said planet gear; and a clutch device including a first clutch arranged between said first sprocket and said first belt disk, a second clutch arranged between said second sprocket and said second belt disk, and a third clutch arranged between said sun gear and said output shaft for switching the operation of said gear device and that of said belt disk device.

23. A transmission system as claimed in claim 22, wherein said clutch device further includes a brake arranged between said second sprocket and said sun gear; said first belt disk, said first clutch and said first sprocket are mounted on said input shaft sequentially from upstream to downstream; and said second belt disk, said second clutch, said second sprocket, said brake, said sun gear, said third clutch and said whirling arm are mounted on said output shaft sequentially from upstream to downstream.

24. A transmission system adapted to receive input power through an input shaft and transmit output power in response to said input power, comprising:

an output shaft for outputting said output power;

a gear device including a first sprocket mounted on said input shaft and a second sprocket mounted on said output shaft for steppedly speed-changing said output shaft having in a first instance a relatively lower rpm;

a belt disk device including a first belt disk mounted on said input shaft and a second belt disk mounted on said output shaft for steplessly speed-changing said output shaft having in a second instance a relatively higher rpm;

a planetary device including a sun gear, a planet gear, a whirling arm and a ring gear, said sun gear connected to said ring gear through said planet gear; and a clutch device including a first clutch arranged between said first sprocket and said first belt disk, a second clutch arranged between said second sprocket and said second belt disk, and a third clutch arranged between said input shaft and said sun gear for switching the operation of said gear device and that of said belt disk device.

25. A transmission system as claimed in claim 24, wherein said clutch device further includes a brake arranged between said second sprocket and said sun gear; said ring gear, said third clutch, said sun gear, said brake, said first sprocket, said first clutch and said first belt disk are mounted on said input shaft sequentially from upstream to downstream; and said second sprocket, said second clutch and said second belt disk are mounted on said output shaft sequentially from upstream to downstream.

* * * * *